United States Patent [19]

Herbst et al.

[11] 4,245,731

[45] Jan. 20, 1981

[54] APPARATUS FOR BEVERAGE CONTAINER RECOVERY AND DEPOSIT REFUND SYSTEM

[76] Inventors: Richard J. Herbst, 2206 S. Knoll St., Arlington, Va. 22202; Robert B. Grant, 261 Lawyers Rd., Vienna, Va. 22180

[21] Appl. No.: 836,096

[22] Filed: Sep. 23, 1977

[51] Int. Cl.³ .............................................. G07F 7/06
[52] U.S. Cl. ................................................... 194/4 C
[58] Field of Search ................. 194/4 C, 4 F, 4 G, 10

[56] References Cited

U.S. PATENT DOCUMENTS

| | | | |
|---|---|---|---|
| 3,015,376 | 1/1962 | Glembring | 194/4 F |
| 3,412,837 | 11/1968 | Myers | 194/4 |
| 3,792,765 | 2/1974 | Arp | 194/4 C |
| 3,857,334 | 12/1974 | Arp | 100/53 |
| 3,907,087 | 9/1975 | Tanaka | 194/4 C |
| 4,054,196 | 10/1977 | Schaufele et al. | 194/4 C |
| 4,132,303 | 1/1979 | Stampleman | 194/4 F |
| 4,141,493 | 2/1979 | Arp | 209/567 X |

Primary Examiner—Stanley H. Tollberg

[57] ABSTRACT

Apparatus and methods for the recovery and recycling of metal, glass, plastic and paper containers and combinations thereof for beverages and similar article containers, which provides reimbursement of container deposits or fees upon the return of such containers. Apparatus and methods may be incorporated in an article dispensing machine with common coin exchange system and with a common container storage system. Apparatus and methods may be a self-contained unit independent of an article dispensing system. Apparatus and methods have the capability of performing operations of compacting, sorting, and storing received containers of varying composition. Apparatus and methods provide for removal of recovered containers from incorporated and self-contained container recovery systems. Apparatus and methods have the capability for reducing, detecting and controlling errors in the return of unacceptable containers. Apparatus and methods provide for the accounting of the recovered containers.

12 Claims, 5 Drawing Figures

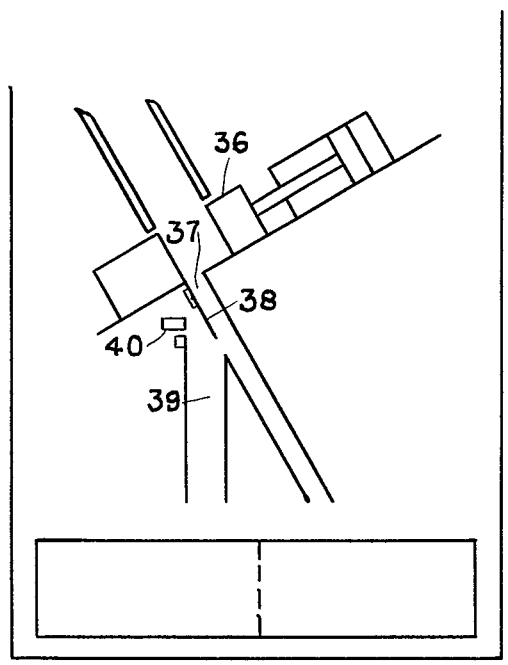
FIG. 3
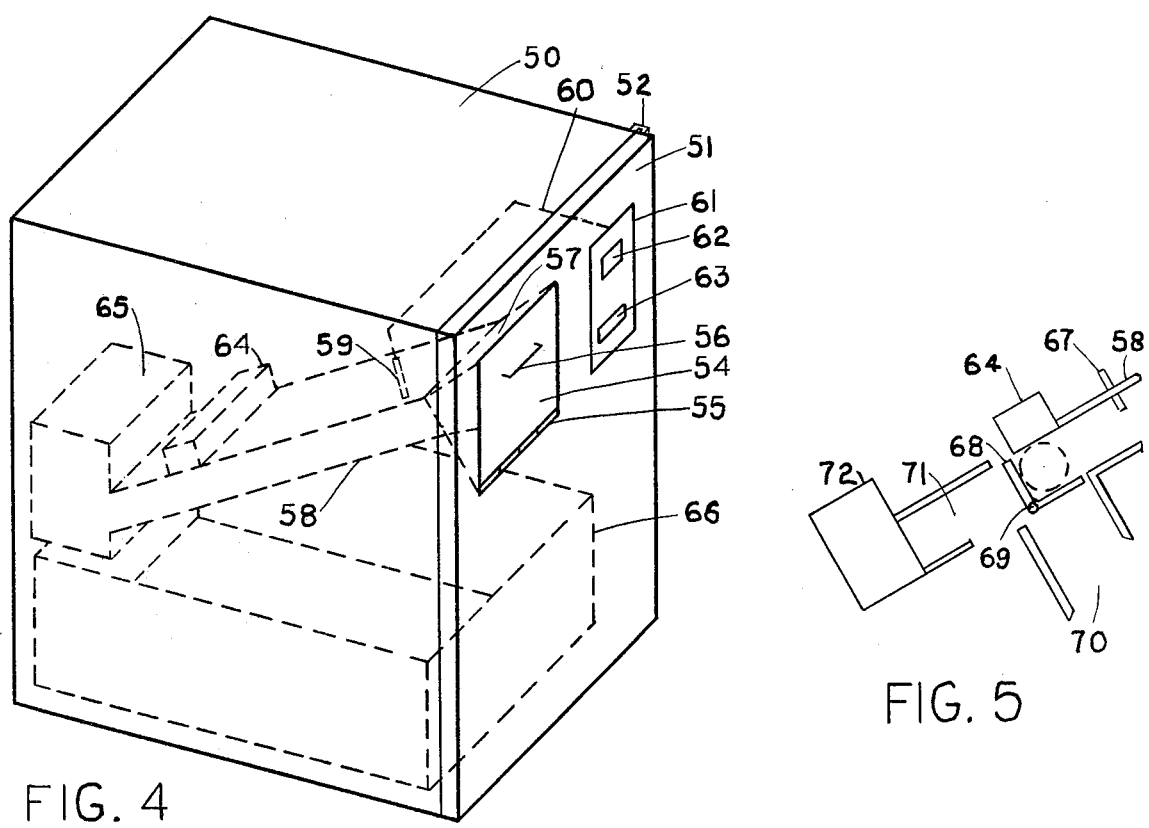
FIG. 4
FIG. 5

APPARATUS FOR BEVERAGE CONTAINER RECOVERY AND DEPOSIT REFUND SYSTEM

BACKGROUND

The economic and population growth of our nation, and the improvements in the standard of living enjoyed by our population, have required increased industrial production to meet our needs, which, together with related commercial, and agricultural operations, have resulted in a rising tide of scrap, discarded, and waste materials. Continuing technological progress and improvement in methods of manufacture, packaging, and marketing of consumer products has resulted in an ever-mounting increase, and in a change in the characteristics, of the mass material discarded by the purchaser of such products.

The concentration of our population in expanding metropolitan and other urban areas has presented these communities with serious financial, management, inter-governmental, and technical problems in the disposal of solid wastes resulting from the industrial, commercial, domestic, and other activities carried on in such areas. Disposal of hazardous and solid waste in or on the land without careful planning and management can present a danger to human health and the environment. Millions of tons of recovered material which could be used are needlessly buried each year. The recovery and conservation of such materials can reduce the dependence of the United States on foreign resources and reduce the deficit in its balance of payments. Further, container recovery represents a potentially significant means for energy conservation.

Article containers represent a substantial portion of the solid waste stream and are the focus of considerable attention. Legislation banning or taxing nonreturnable beverage containers has been the most popular type of source reduction proposal. Although several bills have been introduced in the U.S. Congress, more activity has taken place at the state and local levels. Legislation has been introduced in 50 state legislatures and numerous county and city councils since 1971. As of mid-1975, three states, Oregon, Vermont, and South Dakota, had a law affecting all major types of packaging wastes. Ordinances affecting beverage containers have been passed in such localities as Oberlin, Ohio, London County, Virginia, and Bowie, Maryland, although implementation has been slow due to legal challenges. A mandatory deposit law has been in effect in Oregon since Oct. 1, 1972. A minimum 2-cent refund for beer, malt beverage, and carbonated soft drink containers certified for reuse by more than one manufacturer and a 5-cent refund for all other beverage containers are required.

Previous efforts to obtain the potential material and energy savings and the reduction of environmental damage associated with article container disposal and recovery have been unsuccessful for economic, social or technological reasons. It is widely believed as evidenced in numerous Federal and private reports and Congressional testimony that a mandatory deposit system for beverage containers will result in widespread market disruption in the production use and distribution network for containers and beverages, and in the metal and glass producing industries which provide the material stocks for containers. This expected market disruption would be accompanied by employment and financial losses to individuals, business organizations and selected local communities. To a substantial degree such views have been confirmed in the results of deposit beverage requirements in Oregon, Vermont, and elsewhere. Thus, at present there is not a means for achieving the environmental and resource conservation and recovery objectives without widespread economic disruption.

It is the purpose of this invention to provide a technologically feasible and cost effective means of recovering containers for subsequent reuse and/or recycling and-/or collection for ultimate disposal of non-reusable materials in an environmentally benefitial manner. It provides methods of collecting, sorting, identifying and processing used containers which economizes the efficient use of facilities and contributes to the reduction, reuse and disposal of used containers. It provides means to compensate returnees of used containers, and to record such transactions. It provides a versatile means to recover used containers at the point of article sale, and at subsequent stages after the container is no longer of use as an article container to the article purchaser.

BRIEF DESCRIPTION OF THE DRAWINGS

Referring now to the drawings in which like numerals represent like parts in the several views;

FIG. 3 represents a transverse view showing a modification of the return chute and processing station shown in FIG. 2.

FIG. 4 represents a beverage container and deposit return machine.

FIG. 5 represents a detailed view of an identification and separation mechanism.

DESCRIPTION OF THE PREFERRED EMBODIMENT

Figure 1:
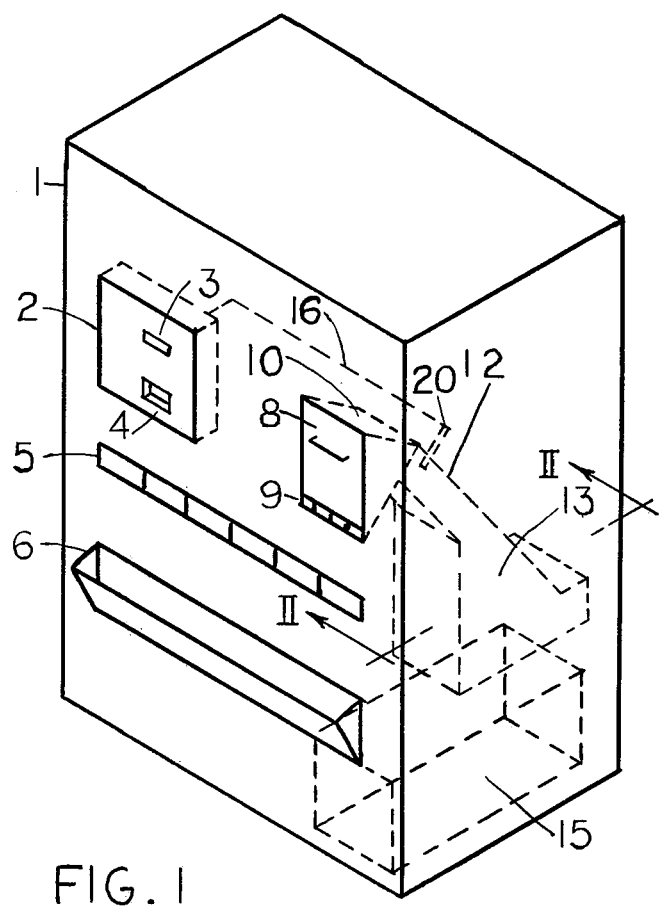
FIG. 1 represents a beverage vending machine provided with an integrated beverage container dispensing and container receiver and deposit return system.

FIG. 1 represents one example of the disclosed invention of a conventional beverage vending machine 1 provided with an integrated beverage container receiver and deposit return system. A coin payment mechanism 2 has a coin receiving slot 3 and a coin change and deposit return compartment 4. Panel 5 represents a beverage selection panel with six possible selections represented in FIG. 1. Purchased beverage is received in a conventional dispensing tray 6. The integrated beverage container and deposit return system is represented by the phantom lines within the vending machine shown in FIG. 1. A door panel 8 is pivotable about a pin or hinge 9 and provided with a beverage container receiving compartment 10 designed to permit a particular number and size containers to be placed therein. As shown in FIG. 1, the compartment 10 is in the closed position and designed to accomodate a single container in a horizontal position such that, upon closure of the door panel 8, the container is dumped from the compartment 10 and under the force of gravity passes through a guide chute 12 to a beverage container processing station 13. The guide chute 12 may comprise a set of four or more guide rods adjustably mounted to accomodate adjustment for the desired container diameter and height dimension commensurate with the dimensions desired for the container receiving compartment 10. Supplemental transport means may be provided to assist the movement of returned containers along the chute 12. as for example by providing an air cushion or pulsed directional air jets. Passage of the returned container through the chute 12 effects actuation of a switch means 20 to transmit an appropriate signal via transmission means 16 to the payment return device 2 to return the appropriate deposit amount of the customer. The returned container continues to be guided through the chute 12 in a horizontal position until it reaches a processing station 13. When the container reaches processing station 13 it will be processed as desired and forwarded to a storage bin 15.

Figure 2:
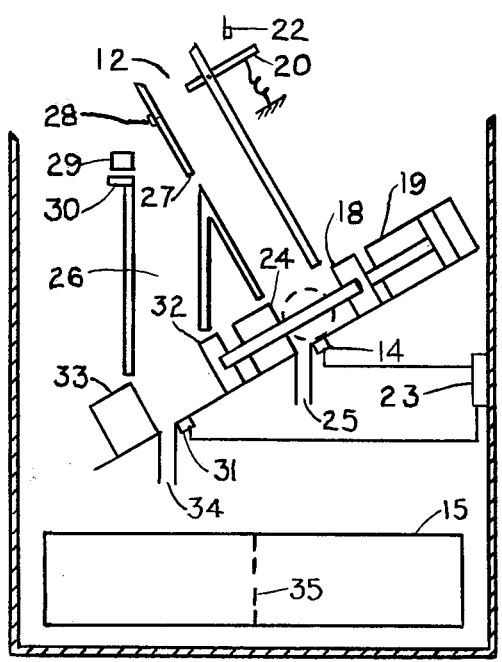
FIG. 2 represents a transverse view taken along line II—II of FIG. 1 showing details of a beverage container return chute and processing station.

FIG. 2 is an end view taken along lines II—II of FIG. 1 and shows in greater detail an example of a processing station for returned beverage containers. As shown in FIG. 2 the processing station 13 comprises a fluid actuated compressing or crushing ram actuated by a fluid motor 19. The ram 18 could be actuated by any other appropriate actuating means such as an electrically driven mechanical advantage device incorporating screw, toggle, or any other mechanical advantage linkage arrangements. Accordingly, the fluid motor 19 represents one example of the ram actuation means. After the container leaves the compartment 10 it passes into and along the guide chute 12 to come into contact with a spring biased pivotal finger means 20, shown in the normal position in FIG. 2. Passage of an uncrushed, appropriately dimensioned returned container pivots the finger means 20 about pivot point 21 to actuate microswitch means 22 or any other similar switch means. Actuation of the switch means 22 sends an appropriate signal to the payment device 2 for proper actuation and release of the appropriate beverage container deposit. By positioning at least two independent fingers such that they are simultaneously depressed by the container ends to effect actuation of at least two microswitch means 22 in series provides an appropriate check on the height of a returned container. If the container is too short the switches 22 will not be actuated to send the appropriate signal to actuate the deposit return mechanism of the payment device 2. Further, proper spacing between the contact switch means 22 and the respective actuating ends of the finger means 20 provides a check on the returned container diameter. Containers of a smaller diameter than the space provided between the switch and finger actuating means would not effect actuation of the switch means 22 to activate the payment return device.

After a properly dimensioned container passes the finger switch means 20 it proceeds to a processing station to actuate microswitch 14. Actuation of switch 14 transmits a signal to a control panel 23 to effect proper actuation of the fluid motor 19 and thus propel the ram 18 toward a fixed press platen 24 whereby the returned container, shown in dashed lines in FIG. 2, is crushed and permitted to drop through a slot 25 into the storage bin 15 upon retraction of the ram 18.

The storage container 15 may be provided with a drain means to permit drainage of any beverage that may have been present in a returned container. This drain means may take the form of a drain tray or drain openings in the storage bin to permit drainage of the beverage to an appropriate storage container. Further, since a compaction or crushing process of a returned container may well expel beverage in uncontrolled directions guide panel or deflecting means could be provided adjacent the processing station to insure that expelled beverage is directed to a drain tray or storage bin 15.

The chute 12 may be provided with a retractable wall portion that leads to another chute 26 in the event it is desired to separate aluminum, glass, or plastic containers from ferrous containers. As shown in FIG. 2 this could be effected by providing a normally closed, spring-biased, pivotal panel 27 made of nonferrous material in the bottom wall of main chute 12. As shown in FIG. 2, panel 27 is pivotable about a spring biased hinge 28. An electromagnet 29 appropriately spaced behind the nonferrous panel 27 is energized upon entry of a returned container into chute 12. Controlled energization of the electromagnet could be effected, for example, by means of a conventional trip switch located in the chute 12 and actuated by the returned container similar to the pivotal finger switch means 20. Such a switch could be a part of or in addition to the switch 20. With the electromagnet energized passage of ferrous material in front of the nonferrous panel 27 will cause the panel 27 to be pivoted about the spring biased hinge 28 and permit the ferrous container to enter chute 26 due to the ferrous container being attracted and propelled toward the fixed electromagnet 29. The electromagnet 29 is appropriately spaced from the panel 27 to permit the desired degree of opening. When the door panel 27 is pivoted to the open position the electromagnet 29 is deenergized when switch means 30, a conventional microswitch for example, is actuated by the panel 27 coming into contact therewith. The panel 27 is mounted for an appropriate degree of swinging movement such that upon deenergization of the electromagnet 29 the ferrous container will fall under the force of gravity into the chute 26 while the spring biased panel 27 returns to its normally closed position. The returned ferrous container then passes through the chute 26 to contact and actuate a microswitch 31. Actuation of switch 31 transmits a signal to the control panel 23 to effect forward actuation of the fluid motor 19. A ram 32 is secured to the ram 18 by means of side support bars disposed on opposite sides of the fixed platen 24. As a result of this connection actuation of the fluid motor 19 drives ram 32 toward a fixed platen 33 to compact the container and permit it to pass through the slot 34 upon retraction of the ram 32. As shown in FIG. 2 the storage bin may be provided with a vertical wall, shown in dashed lines, in order to provide a distinct storage area for ferrous containers.

Another embodiment of the ram compaction processing system is shown in FIG. 3. The system shown in FIG. 3 comprises a single ram 36 to flatten or crush containers prior to separating the ferrous containers from the nonferrous containers. After crushing a container retraction of the ram 36 permits the compressed container to drop into a chute 37 provided with a nonferrous panel 38. An electromagnet 40 is spaced from and behind panel 38 in a fixed position. The electromagnet 40 is energized and draws ferrous containers the chute 39 in the same manner as described with respect to the operation of the nonferrous panel 27 of FIG. 2.

The processing crushing or compacting rams may be of various desired forms such as a combined crushing and shearing ram whereby the container end walls are sheared from the container and the sidewall portion is simultaneously or subsequently crushed, flattened or pierced in a predetermined manner. Further, the ram could be replaced by a conventional shredding device or marking device for identifying the container as having been refunded such as by painting or piercing the container. Further, chute 12 may be designed to lead directly to the storage bin without engagement of a processing device.

FIG. 4 represents another embodiment of a beverage container and deposit return system. This apparatus comprises a cabinet 50 provided with a door panel 51 which is pivotable about hinge 52. The door panel 51 is secured in a closed position by means of a conventional cabinet lock. A beverage container receiving station 10 comprises a panel 54 pivotable and biased in a normally closed position by means of a spring biased hinge 55. A handle 56 is provided on the front side of the panel 54 to provide a hand grip for the consumer to swing the receiving station to the open position and expose the back side of the panel 54 provided with the container receiving compartment 57. The compartment 57 is of a desired configuration for receiving a desired number of predetermined kinds of containers. As shown in FIG. 4 the container receiving station is in a closed position with container receiving compartment aligned with chute 58 shown in phantom lines. The compartment 57 is dimensioned such that upon closure of panel door 54 the returned container(s) are released from the compartment 57 under the force of gravity and pass through the chute 58 in a manner similar to that described with respect to the apparatus shown in FIGS. 1 through 3. Finger detecting means 59, similar to the finger detector means 20 shown in FIG. 2, are provided in the chute 58 to detect properly dimensioned returned containers and transmit an appropriate signal, either electrical or mechanical, via transmission connection 60 to actuate a payment deposit return mechanism 61. The deposit return mechanism 61 may remit coin, coupon, or token and record the number of returned containers. Further, the mechanism could be provided with a switch means 62, such as a push button switch, for actuating the deposit return mechanism after the customer has returned a multiple number of containers such that a single totaled coupon or deposit amount is released to the payment return slot 63. Such a switch would provide a summing function for the number of containers returned and corresponding refund amount.

An identifying device 64 may be provided, such as a low intensity laser beam reader or magnetic detector for reading, for example, universal product codes, embossments or any other desired indicia on returned containers. The identifying device may be provided for several purposes such as reading container deposits in the event container deposits deposits are different for different container sizes or types, or to identify categories of containers for subsequent separation and direction to a processing station 65 and/or storage area 66. Further, an identifying device may be programmed to effect the deposit return for appropriately identified containers as for example by use of a universal product code system type marking.

FIG. 5 shows in more detail an example of an identifying and separation device operation. FIG. 5 is a side view of chute 58 leading to the identifying device 64 as also shown in FIG. 4. Returned containers passing through chute 58 pass a retractable indexing finger 67 to sequentially feed a single container to the identifying station provided with the desired identifying means 64. If for example the identifying device is a low intensity laser beam reader, roller or drive wheels may be provided in the top or bottom walls of the chute at the identifying station to rotate the container a single revolution and effect and insure reading of the universal product code. If the markings or embossments are located on the end walls or bottoms of containers the identifying means be appropriated located in the chute to effect proper reading.

After the container has been identified an appropriate signal is sent to a drive motor to actuate an L-shaped directional feed member 68. The L-shaped feed member 68 is pivotably mounted about pin 69 and controlled for clockwise and counter clockwise movement thereabout and thus direct identified containers in a predetermined fashion into either chute 70 or 71. For example, if the container, shown in dashed lines in FIG. 5, is identified as a refillable container, a signal is sent to the control drive for the L-shaped member 68 to rotate a quarter turn in a clockwise direction and thus feed the container into chute 70. Once the container is fed into chute 70 the L-shaped member is returned to its initial position ready to receive the next container that is released by the indexing device. If, for example, the next container is identified as a non-refillable container, the preprogrammed signal that will be sent to the control drive motor for L-shaped member 68 will effect a counter clockwise rotation for member 68 and feed the nonrefillable container to the other chute 71 that could lead for example to a processing station 72 similar to the processing stations shown and described with respect to FIGS. 1 through 3.

Another example of the form an identifying device may take would be the provision of two electrical contact points located in the path of the identifying station such that the positioning of metallic containers there would complete a circuit through the metal container body and effect transmission of an appropriate signal to forward the containers into chute 71. While failure to complete a circuit in a timed fashion would effect transmission of a preprogrammed signal to direct nonmetallic containers into chute 70. As previously noted the identifying device may also effect the transmission of the appropriate deposit return signal to the payment device 61 in lieu of switch 59.

What is claimed is:

1. In combination with a beverage vending machine for dispensing purchased beverages, said machine being provided with a coin return system, the improvement comprising;
    means for receiving purchased beverage containers having a deposit associated therewith,
    means for remitting said deposit upon appropriate identification via actuation said coin return system and means comprising at least two movable elements for contacting a returned container, said elements controlling at least two switch means in a circuit for identifying said container.

2. The combination as defined in claim 1, further comprising,
    means for processing returned purchased containers to reduce the volume thereof for compact storage.

3. The combination as defined in claim 2, wherein said means for processing comprises a compactor.

4. The combination as defined in claim 2, wherein said means for processing comprises a shredder.

5. The combination as defined in claim 1, further comprising,
    means for distinguishing and separating ferrous from nonferrous returned beverage containers.

6. The combination as defined in claim 1, wherein said means for receiving purchased beverage containers, further comprises,
   a pivotal door provided with a compartment to receive beverage containers of predetermined size,
   means for moving said pivotably mounted door from an open to a closed position for transporting a returned beverage container to a means for transporting and guiding a returned beverage container past a deposit return payment actuating mechanism and onto a storage area via the force of gravity.

7. The combination as defined in claim 1, further comprising means for directing the movement of waste liquids contained in returned containers.

8. The combination as defined in claim 7, further comprising a liquid drain and segmented storage means.

9. The combination as defined in claim 1, further comprising means for determining the appropriate amount of payment for containers having differing amounts of deposit value.

10. The combination as defined in claim 1, further comprising a means for recording the number, type and value of remitted payments.

11. In combination with a machine for receiving bottles and cans and remitting payment therefor, the improvement comprising means locating and identifying signs, codes and lables for determining the appropriate amount of payment for containers having differing amounts of deposit value and a deposit remitting means controlled by the determining means.

12. The combination as defined in claim 11, wherein said means comprises means to record the number, type and amount of remitted deposits.

* * * * *